United States Patent
Weber

(10) Patent No.: US 6,874,533 B2
(45) Date of Patent: Apr. 5, 2005

(54) 3/2 NORMALLY CLOSED MODULE

(75) Inventor: Alexis C. Weber, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/603,454

(22) Filed: Jun. 25, 2003

(65) Prior Publication Data

US 2004/0261863 A1 Dec. 30, 2004

(51) Int. Cl.[7] .............................................. F15B 13/044
(52) U.S. Cl. ................... 137/596.17; 137/864; 137/870
(58) Field of Search ............................ 137/596.17, 864, 137/870; 251/129.14

(56) References Cited

U.S. PATENT DOCUMENTS

| | | | | | |
|---|---|---|---|---|---|
| 4,391,292 | A | * | 7/1983 | Millar | 137/596.17 |
| 4,610,267 | A | * | 9/1986 | Beck et al. | 137/596.17 |
| 4,997,004 | A | * | 3/1991 | Barkhimer | 137/596.17 |
| 5,669,406 | A | * | 9/1997 | Gluf, Jr. | 137/596.17 |
| 5,950,984 | A | * | 9/1999 | Anderson et al. | 137/596.17 |
| 6,386,218 | B1 | * | 5/2002 | Ness et al. | 137/596.17 |
| 6,409,145 | B1 | | 6/2002 | Fong et al. | 251/129.18 |
| 6,578,933 | B2 | | 6/2003 | Hageman et al. | |
| 6,619,616 | B1 | * | 9/2003 | Sudani et al. | 137/596.17 |
| 6,644,350 | B1 | * | 11/2003 | Douglass et al. | 137/596.17 |
| 2002/0117216 | A1 | * | 8/2002 | Ambrose et al. | 137/596.17 |
| 2004/0045611 | A1 | * | 3/2004 | Avila | 137/596.17 |

FOREIGN PATENT DOCUMENTS

| | | | | |
|---|---|---|---|---|
| DE | 1 920 274 | * | 11/1970 | 137/596.17 |
| JP | 62-2082 A | * | 1/1987 | 137/596.17 |
| JP | 63-297875 A | * | 12/1988 | 137/596.17 |

* cited by examiner

Primary Examiner—Gerald A. Michalsky
(74) Attorney, Agent, or Firm—Jimmy L. Funke

(57) ABSTRACT

A 3/2 normally closed module includes a main body, a housing and a magnetically energizable coil. The main body includes a bore, an armature and a rod. The housing includes first and second valve seats and is configured to receive a first and second ball. The housing also includes a first, a second and a third port. When the module is in an energized state, current flows through the coil, generating a magnetic field. The magnetic field forces the armature against the rod, which in turn, forces the first ball to engage the first valve seat. As the first ball engages the first valve seat, the first ball forces the second ball to disengage from the second valve seat. As a result, a fluid flow path is created between the first and second ports. When the module is in a de-energized state, a spring, disposed between the main body and the second ball, forces the second ball to engage with the second valve seat. When the second ball engages the second valve seat, the second ball forces the first ball to disengage from the first valve seat. As a result, a fluid flow path is created between the first and second ports.

11 Claims, 1 Drawing Sheet

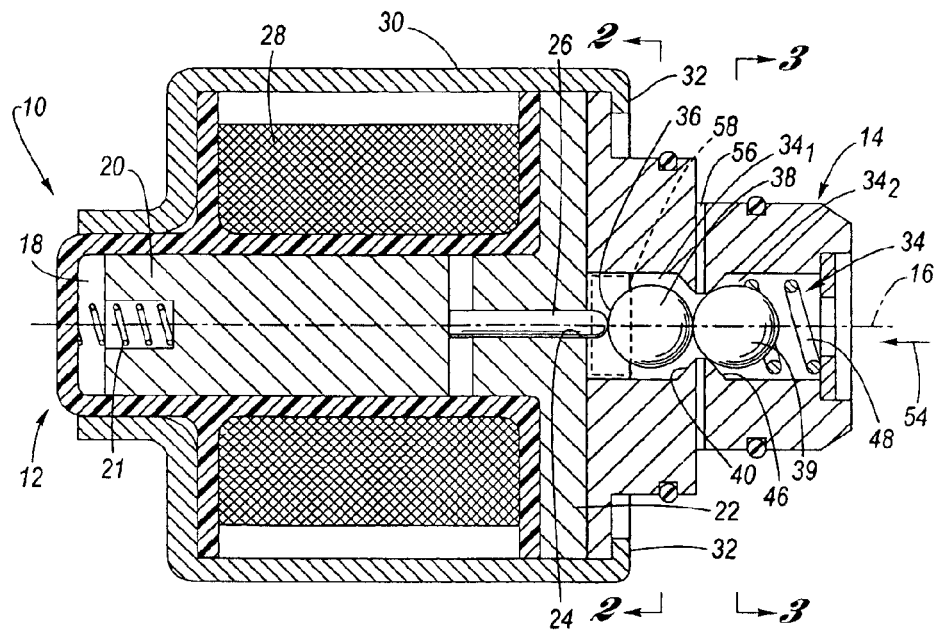
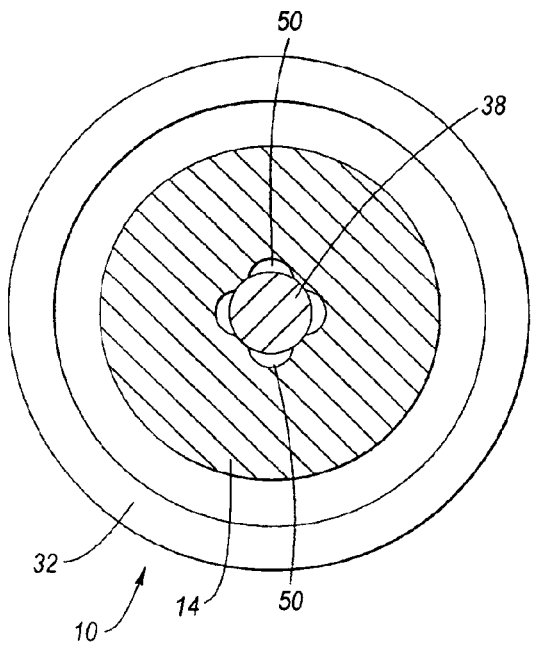
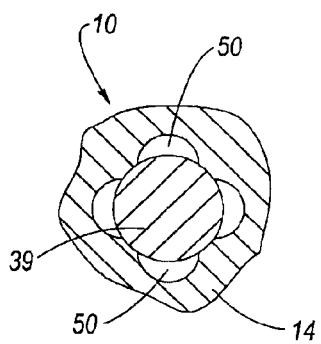

3/2 NORMALLY CLOSED MODULE

BACKGROUND OF THE INVENTION

1. Technical Field

The present invention is directed generally to modules, and, in particular, to 3/2 normally closed modules.

2. Description of the Related Art

It is known to provide a module configured to selectively control fluid flow from a first port to a second port, as seen by reference to U.S. Pat. No. 6,409,145 to Fong et al ("Fong"). Fong discloses an armature in combination with a valve seat to implement this fluid control. However, a problem generally encountered in the module field involves providing a module with a magnetic package strong enough to overcome the spring load required to maintain a tight seal. Such magnetic packages often impose both size and cost constraints which limit their use. Large magnetic packages also inflict significant mechanical stresses on a module that affect the module's long term performance. Another problem generally encountered in the module field involves providing a module where the component used to seal a valve, such as a poppet, is accurately machined to provide a tight seal. To accurately machine such a component is expensive, and the resulting component often does not provide a tight seal. Accordingly, there is a need in the art for providing a module that minimizes or eliminates one or more of the above-mentioned shortcomings.

SUMMARY OF INVENTION

One object of the invention is to provide a solution to one or more of the above mentioned requirements. One advantage of the present invention is that its smaller size simplifies its installation and allows for its utilization in spatially constrained environments. Another advantage of the present invention is lower cost resulting from replacing expensive precision components, such as poppets, with inexpensive balls, such as ball bearings. Another advantage of the present invention is the enhanced sealing capability resulting from the use of ball bearings to seal the valve seats. Still another advantage of the present invention is that it is robust to misalignment as well as errors in concentricity, and parallelism because the primary plate can be off-centered and/or tilted without affecting the performance of the armature and rod assembly.

In one aspect of the invention, a module includes a main body, a housing and a magnetically energizable coil. The main body includes a bore, an armature and a rod. The housing includes first and second valve seats and is configured to receive a first and second ball. The housing also includes a first, a second and a third port.

When the module is in an energized state, current flows through the coil, generating a magnetic field. The magnetic field forces the armature against the primary plate and pushes on the rod, which in turn, forces the first ball to engage the first valve seat. When the first ball engages the first valve seat, the first ball forces the second ball to disengage from the second valve seat. As a result, a fluid flow path is created between the first and second ports. When the module is in a de-energized state, a spring, disposed between the main body and the second ball, together with the hydrostatic pressure on the second port, forces the second ball to engage with the second valve seat. When the second ball engages the second valve seat, the second ball forces the first ball to disengage from the first valve seat. As a result, a fluid flow path is created between the first and third ports.

Other features, objects and advantages of the present invention will become apparent to one of ordinary skill in the art from the description that follows and may be realized by means of the instrumentalities and combinations particularly pointed out in the appended claims, taken in conjunction with the accompanying drawings.

BRIEF DESCRIPTION OF THE DRAWINGS

The present invention will now be described, by way of example, with reference to the accompanying drawings, in which:

FIG. 1 is a cross-sectional view of a module having a main body and a housing;

FIG. 2 is a cross-sectional view of a fluted well as viewed looking toward the main body, in accordance with the present invention; and FIG. 3 is a cross-sectional view of a fluted well as viewed looking toward the second ball, in accordance with the present invention;

DESCRIPTION OF THE PREFERRED EMBODIMENTS

Referring now to the drawings wherein like reference numerals are used to identify identical components in the various views, FIG. 1 illustrates one embodiment of a module 10 having a main body 12 and a housing 14. Main body 12 is generally configured for selective control of fluid flow through housing 14. Housing 14 is generally configured to provide the combination of input/output ports to allow such fluid flow.

Main body 12 is centered about an axis 16. Main body 12 has a first bore 18 within which an armature 20 resides. Both bore 18 and armature 20 are centered about axis 16. Armature 20 is made from a ferromagnetic material. The shape of armature 20 can be altered to meet design requirements and thus is not limited to the exemplary shape illustrated in FIG. 1. Armature 20 extends along axis 16 within bore 18. Main body 12 also has a coil 28 centered about axis 16. In the illustrated embodiment, when coil 28 is energized, an axial magnetic force acts on armature 20 in the direction of a primary plate 22. Primary plate 22 comprises a ferromagnetic material and is configured to establish flux paths for the magnetic flux generated by coil 28. Primary plate has a second bore 24 extending along axis 16. Main body 12 further includes a first spring 21 disposed between main body 12 and armature 20. Spring 21 is centered about axis 16 and preloads armature 20 with an axial force urging armature 20 toward primary plate 22. A rod 26, disposed between armature 20 and a first ball 38, discussed in further detail below, extends through second bore 24. Main body 12 further includes a frame 30. Frame 30 comprises a ferromagnetic material and is generally annular, thus extending substantially along the perimeter of main body 12. Frame 30 together with primary plate 22, and armature 20 act as flux paths for the magnetic flux generated by coil 28. Flanges 32 on frame 30 project radially inward toward axis 16. Flanges 32 are configured to affix housing 14 and main body 12.

Still in reference to FIG. 1, housing 14 includes a well 34 centered about axis 16 which includes a first well $34_1$ configured to receive first ball 38 and a second well $34_2$ configured to receive second ball 39. In the illustrated embodiment, when coil 28 is energized, the magnetic field generated by coil 28 will force armature 20 against the primary plate 22, pushing on the rod 26. Rod 26 is guided through an opening 36 exerts a force on a first ball 38. First ball 38 and a second ball 39 are axially movable within first and second wells $34_1$ and $34_2$. When displaced by rod 26, first ball 38 engages a first valve seat 40 within first well $34_1$, thereby causing second ball 39 to disengage from a second valve seat 46 within second well $34_2$. Once second ball 39 is disengaged from second valve seat 46, fluid flow is permitted between a first port 54 and a second port 56. First and second wells $34_1$ and $34_2$ may also contain a set flutes 50, best shown in FIG. 2 and FIG. 3. Flutes 50 minimize non-axial movement of first ball 38 and second ball 39 within first and second wells $34_1$ and $34_2$ while allowing fluid flow past the balls. The shape of flutes 50 can vary depending upon design requirements, thus the invention is not limited to the exemplary shapes of flutes 50 as depicted in FIGS. 2 and 3. A second spring 48 links second ball 39 to main body 12. Second spring 48 slightly preloads second ball 39, causing it to remain engaged with second valve seat 46 until module 10 is energized.

Referring again to FIG. 1, when module 10 is in an energized state, current supplied from an external source, not shown, flows through coil 28. This current flow induces a magnetic field, which is mostly contained within module 10 by primary plate 22, armature 20 and frame 30. As armature 20 moves toward primary plate 22, it exerts a force on rod 26 as it slides axially through opening 36. Rod 26 exerts a force on first ball 38, forcing first ball 38 to engage first valve seat 40 and compressing second spring 48. Once first ball 38 engages first valve seat 40, the preload supplied by second spring 48, which forces second ball 39 to engage with second valve seat 46 while module 10 is in a de-energized state, will be overcome. Hence, second ball 39 is disengaged from second valve seat 46, thereby allowing fluid to flow between first port 54 and second port 56. In one embodiment of the invention, first port 54 can be a supply port that directs fluid flow, while second port 56 can control fluids from external sources not shown to module 10.

When module 10 is in a de-energized state, no current flows through coil 28. Because no magnetic flux is present to force armature 20 to move toward primary plate 22, there is no force present to overcome the preload supplied by second spring 48. Thus, second ball 39 is forced by preloaded second spring 48 to engage with second valve seat 46. First ball 38 is forced to disengage from first valve seat 40. As first ball 38 is disengaged from first valve seat 40, a fluid flow path is created between second port 56 and a third port 58. In one embodiment of the invention, third port 58 can exhaust fluids from module 10. The use of the nomenclature "3/2 module" indicates that the module has three ports that permit two paths of fluid flow. For example, when module 10 is in an energized state, fluid flow is permitted between first port 54 and second port 56, constituting one path for fluid flow. When module 10 is in a de-energized state, fluid flow is permitted between second port 56 and third port 58, constituting a second path for fluid to flow.

From the foregoing, it can be seen that a new and improved module has been brought to the art. It is to be understood that the preceding description of the preferred embodiments is merely illustrative of some of the many specific embodiments that represent applications of the principles of the present invention. Other arrangements would be evident to those skilled in the art without departing from the scope of the invention as defined by the following claims.

What is claimed is:

1. A 3/2 normally closed module, comprising:
   a main body including a bore having a longitudinal axis associated therewith, said main body further including an armature selectively axially slidable within said bore, said main body further including a rod affixed to a first end of said armature whereby said rod is axially slidable with said armature; and
   a housing configured to receive a first ball, said housing including a first and a second valve seat, said first ball being selectively urged into engagement with said first valve seat, said housing further being configured to receive a second ball, said second ball being selectively being urged into disengagement from said second valve seat, said housing further including a supply port configured to cooperate with said first ball and said second ball to selectively permit fluid flow into said module, said housing further including a control port in selective communication with said supply port whereby when said module is in a selectively energized state, fluid flows between said supply port and said control port, said housing further including an exhaust port in selective communication with said control port whereby when said module is in a selectively de-energized state, fluid flows between said exhaust port and said control port, said supply port being concentric with said longitudinal axis, said module further including a first spring disposed between said main body and a second end of said armature opposite said first end, said housing further including a second spring proximate said supply port and disposed between said housing and said second ball, said second spring having a preload force urging said second ball toward said second valve seat.

2. The module of claim 1 further including a magnetically-energizable coil whereby when said coil is in a selectively energized state, said armature axially magnetically moves toward said first ball, thereby forcing first ball into engagement with said first valve seat, whereby when said first ball engages said first valve seat, said first ball axially forces said second ball to disengage from said second valve seat to thereby permit fluid flow between said control port and said supply port.

3. The module of claim 1 further including magnetically-energizable coil whereby when said coil is in a selectively de-energized state, said second spring, axially forces said second ball to engage with said second valve seat, whereby when said second ball engages said second valve seat, said second ball disengages said first ball from said first valve seat thereby permitting fluid flow between said control port and said exhaust port.

4. The module of claim 1 whereby said housing further includes a first well having at least one axially-extending flute to inhibit non-axial movement of said first ball within said first well.

5. The module of claim 4 whereby said housing further includes a second well having at least one axially-extending flute to inhibit non-axial movement of said second ball within said second well.

6. A normally closed module, comprising:
   main body means including a bore having a longitudinal axis associated therewith, said main body means further including armature means selectively axially slidable within said bore, said main body means further including rod means affixed to a first end of said armature means whereby said rod means are axially slidable with said armature means; and
   housing means including a first well configured to receive first ball means, said first ball means being axially movable within said first well, said first well further including first valve seat means, said first ball means being selectively urged into engagement with said first valve seat means, said housing further including a second well configured to receive second ball means, said second ball means configured to be axially movable within said second well, said second well further including second valve seat means, said second ball means being selectively urged into engagement with said second valve seat means;

actuation means for energizing a coil to move said armature, said actuation means having an energized state and a de-energized state, whereby when said actuation means is in said energized state, said first ball means are forced into engagement with said first valve seat means, thereby disengaging said second ball means from said second valve seat means, permitting fluid flow between a first port and a second port, whereby when said actuation means is in said de-energized state, said second ball means is engaged with said second valve seat means, thereby forcing said first ball means to disengage from said first valve seat means, permitting fluid flow between a said second port and a third port, said first port being concentric with said longitudinal axis, said module further including a first spring between said main body means and said armature means, said module further including a second spring proximate said first port between said housing means and said second ball means and having a preload force urging said second ball means toward said second valve seat means.

7. The module of claim 6 wherein said first well has axially-extending flute means to inhibit non-axial movement of said first ball means within said first well.

8. The module of claim 6 wherein said second well has axially-extending flute means to inhibit non-axial movement of said second ball means within said second well.

9. A fluid control module, comprising:

a main body including a bore having a longitudinal axis;

an armature axially slidable within said bore;

a rod affixed to a first end of said armature whereby said rod is axially slidable with said armature;

a housing having a first and a second valve seat, said housing being configured to receive a first ball that is axially movable into engagement with said first valve seat and a second ball that is axially movable into engagement with said second valve seat, said housing further having (i) a first port concentric with said longitudinal axis (ii) a second port and (iii) a third port;

a first spring in said bore between said body and a second end of said armature opposite said first end, said first spring urging said armature and rod into contact with said first ball;

a second spring in said housing proximate said first port having a preload force urging said second ball into engagement with said second valve seat;

a coil surrounding said armature that is selectively energizable to establish an axial magnetic force on said armature;

wherein when said coil is in a de-energized state said preload force maintains said second ball in engagement with said second valve seat, said housing and said first and second balls being configured such that when said second ball is in engagement with said second valve seat said first ball is disengaged from said first valve seat creating a first fluid path between said second and third ports; and wherein when said coil is in an energized state said axial magnetic force acts on said armature so as to move said first ball into engagement with said first valve seat, said housing and said first and second balls being configured such that when said first ball is in engagement with said first valve seat said second ball is disengaged from said second valve seat creating a second fluid path between said first and second ports.

10. The module of claim 9 wherein said housing further includes a first well having at least one axially-extending flute to inhibit non-axial movement of said first ball within said first well.

11. The module of claim 10 wherein said housing further includes a second well having at least one axially-extending flute to inhibit non-axial movement of said second ball within said second well.

* * * * *